United States Patent
Sommarström

(10) Patent No.: US 10,093,189 B2
(45) Date of Patent: Oct. 9, 2018

(54) DEVICE AND METHOD FOR ESTABLISHING A TEMPORARY CONNECTION BETWEEN TWO MOVABLE OBJECTS

(71) Applicant: CELECTIVE SOURCE AB, Älvsjö (SE)

(72) Inventor: Mats Sommarström, Älvsjö (SE)

(73) Assignee: ABB Schweiz AG, Baden (CH)

( * ) Notice: Subject to any disclaimer, the term of this patent is extended or adjusted under 35 U.S.C. 154(b) by 160 days.

(21) Appl. No.: 15/119,483

(22) PCT Filed: Feb. 20, 2015

(86) PCT No.: PCT/SE2015/050197
§ 371 (c)(1),
(2) Date: Aug. 17, 2016

(87) PCT Pub. No.: WO2015/126320
PCT Pub. Date: Aug. 27, 2015

(65) Prior Publication Data
US 2017/0050526 A1 Feb. 23, 2017

(30) Foreign Application Priority Data
Feb. 21, 2014 (SE) .................................... 1450210-8

(51) Int. Cl.
*G06F 19/00* (2018.01)
*B60L 11/18* (2006.01)
(Continued)

(52) U.S. Cl.
CPC ........... *B60L 11/1816* (2013.01); *B25J 9/009* (2013.01); *B25J 13/089* (2013.01);
(Continued)

(58) Field of Classification Search
CPC .............. B60L 11/1816; B60L 11/1818; B60L 11/1827; B60L 11/1835; B60L 11/1846;
(Continued)

(56) References Cited

U.S. PATENT DOCUMENTS 3,917,196 A  11/1975  Pond
4,408,943 A  10/1983  McTamaney
(Continued)

FOREIGN PATENT DOCUMENTS

DE  20 2011 051271 U  11/2012
DE  202011051271 U1  11/2012
(Continued)

OTHER PUBLICATIONS

Extended European Search Report from corresponding European Patent Application No. 15751542.0, dated Oct. 16, 2017.
(Continued)

*Primary Examiner* — Ronnie M Mancho
(74) *Attorney, Agent, or Firm* — Tucker Ellis LLP

(57) ABSTRACT

Device (100) for achieving a temporary connection between two objects (101,102) which are movable relative to each other, comprising •respective connecting means (114,154), being brought together in order to jointly establish said connection, •a movable robot (110), arranged to continuously displace the first connecting means relative to the first object, •a control means (120), arranged to control the movements of the robot relative to the first object, as well as •a sensor means (130), arranged to continuously read a relative position between the first connecting means and the second connecting means while the said objects move relative to each other. The invention is characterized in that the control means is arranged to, while the objects move relative to each other, continuously control the robot so that the first connecting means is displaced, relative to the first
(Continued)

object and up to the second connecting means, and there connects to the second connecting means. The invention also relates to a method.

17 Claims, 9 Drawing Sheets

(51) Int. Cl.
B64D 39/00 (2006.01)
B67D 9/02 (2010.01)
B63B 27/34 (2006.01)
B25J 9/00 (2006.01)
B25J 13/08 (2006.01)
B67D 7/04 (2010.01)

(52) U.S. Cl.
CPC ....... *B60L 11/1818* (2013.01); *B60L 11/1827* (2013.01); *B60L 11/1835* (2013.01); *B60L 11/1846* (2013.01); *B63B 27/34* (2013.01); *B64D 39/00* (2013.01); *B67D 9/02* (2013.01); *B60L 2200/28* (2013.01); *B60L 2200/32* (2013.01); *B67D 7/0401* (2013.01); *B67D 2007/0403* (2013.01); *G05B 2219/40082* (2013.01); *Y02T 10/7005* (2013.01); *Y02T 10/7072* (2013.01); *Y02T 90/121* (2013.01); *Y02T 90/125* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ......... B25J 9/009; B25J 13/089; B63B 27/34; B64D 39/00; B67D 9/02
USPC ........................................................ 700/245
See application file for complete search history.

(56) References Cited

U.S. PATENT DOCUMENTS

| | | | | |
|---|---|---|---|---|
| 5,380,978 | A * | 1/1995 | Pryor | B23K 26/032 219/121.64 |
| 6,070,109 | A * | 5/2000 | McGee | B25J 9/1692 700/254 |
| 6,408,252 | B1 * | 6/2002 | De Smet | B25J 9/1692 700/254 |
| 8,215,256 | B2 | 7/2012 | Montgomery | |
| 9,258,550 | B1 * | 2/2016 | Sieracki | H04N 13/0282 |
| 2003/0200042 | A1 * | 10/2003 | Gan | B25J 9/1692 702/105 |
| 2005/0045821 | A1 * | 3/2005 | Noji | G01N 23/225 250/311 |
| 2008/0237400 | A1 | 10/2008 | Gryniewski | |
| 2010/0272517 | A1 | 10/2010 | Montgomery | |
| 2010/0282912 | A1 | 11/2010 | Bogg | |
| 2011/0082612 | A1 | 4/2011 | Ichikawa | |
| 2013/0140403 | A1 | 6/2013 | Goff | |
| 2013/0211782 | A1 * | 8/2013 | Rosenberg | B25J 9/16 702/182 |
| 2014/0166156 | A1 | 6/2014 | Dicke-Kuenitz | |

FOREIGN PATENT DOCUMENTS

KR 20120050791 A 5/2012
WO 2009141675 A1 11/2009

OTHER PUBLICATIONS

International Search Report from counterpart International Patent Application No. PCT/SE2015/050197, dated Jul. 21, 2015.
International Preliminary Report on Patentability from counterpart International Patent Application No. PCT/SE2015/050197, completed Apr. 19, 2016.

* cited by examiner

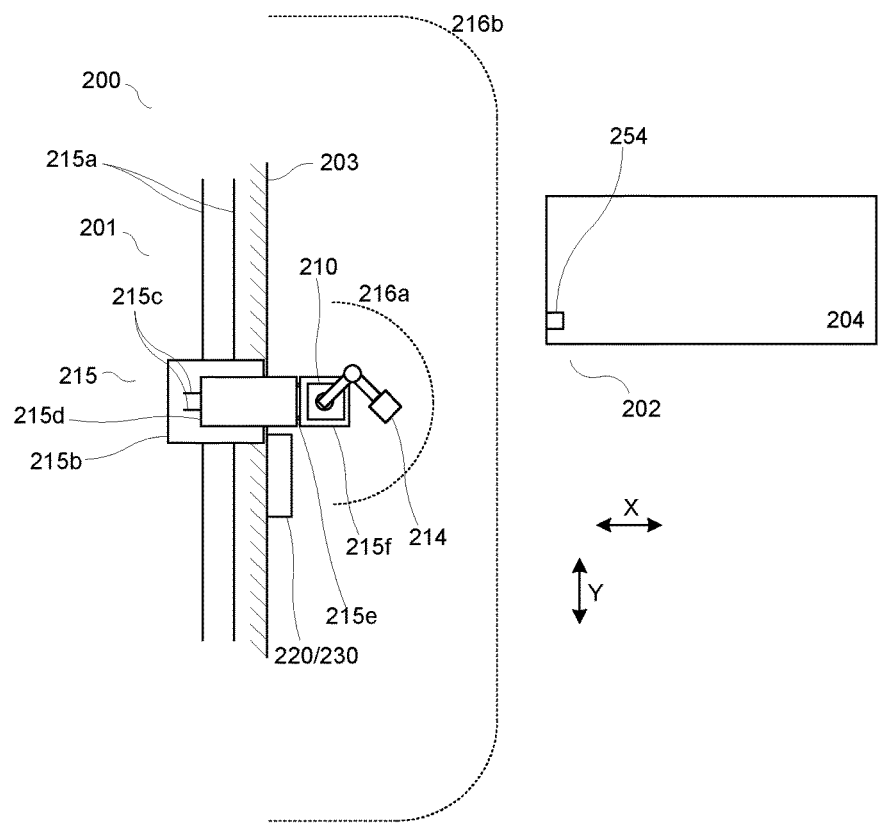
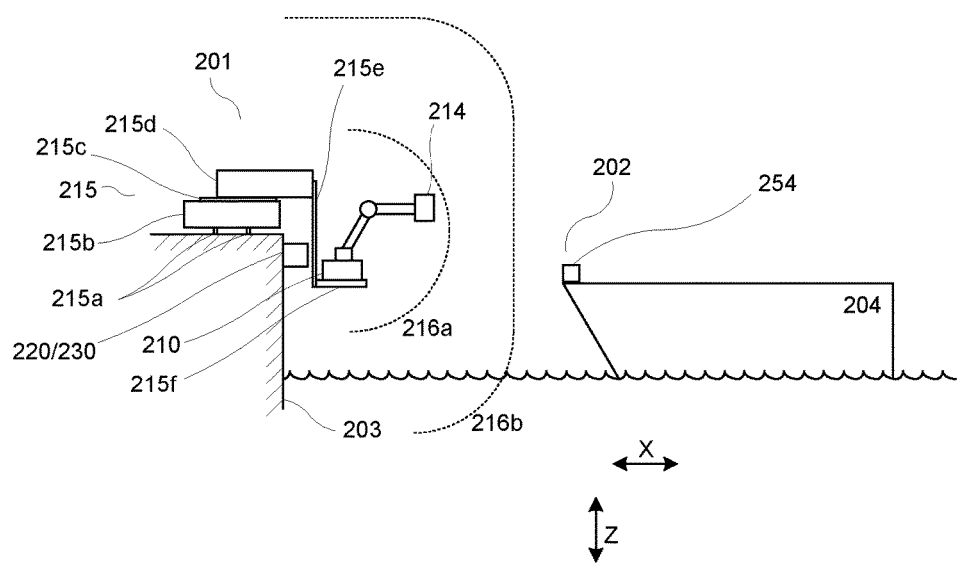

DEVICE AND METHOD FOR ESTABLISHING A TEMPORARY CONNECTION BETWEEN TWO MOVABLE OBJECTS

The present invention relates to a device and a method for establishing a temporary connection between two objects that are movable in relation to each other, particularly where both objects comprise a respective connecting means, and wherein the temporary connection is established by the connecting means being connected to each other.

In many situations, objects that are movable in relation to each other need to be connected, such as various vehicles which are movable relative to each other or a moving vehicle that is movable to an installation on land which is fixed as such. It is also common that there is a need for such temporary connections to be established and maintained for a period of time during which the objects are not only movable, but are actually moving relative to each other.

For example, systems are previously known for automatic mooring of boats at quays, which systems retain the boat in question while a connection for, for example, fresh water supply and electricity, is established and maintained.

US 2010272517 discloses a system of this type, wherein a boat is softly captured by a mooring means of a quay, which is pushed out to the boat's hull and then reduces the speed of the boat towards the quay by pressing against the hull. The mooring means may comprise suction cups.

U.S. Pat. No. 821,526 discloses a similar system, in which a mooring means actively follows the movements of the boat while the boat is being moored.

For land based vehicles, it is known, for example from US2011082612, to detect the position of such a vehicle, to engage with it and to bring it into a position in which an electrical connection can be established between the vehicle and a charging station.

Within the same earlier technical field it is known to use a multi-axis robotic arm to automatically move a connector to a vehicle and there to establish an electrical connection.

Within the field of avionics, it is known, for example from US20100282912, to actuate a first movable object, in the form of an aircraft, in relation to a second moving object, in the form of a second aircraft, such that a connection between the objects is established by means of respective connecting means.

It would be desirable to provide a flexible and automatic way to make a connection between two objects that are movable in relation to each other, which objects can be allowed to move relative to each other in an at least partially unpredictable manner while a connection is being established and maintained.

Furthermore, in many applications for example within the field of public transport, such as electrically driven traffic ferries and coaches, it is desirable to transfer as much electrical energy as possible to a craft during a limited charging time during which the craft exists at a loading station. This is especially a problem because it requires significant investments to provide a charging system that can transmit high power electrical energy.

The corresponding problem exists, for example, for boats and ships in sea locks, where there is also limited time for filling and draining of water and the like.

The present invention solves the above described problems.

Hence, the invention relates to a device for providing a temporary connection between two objects that are movable in relation to each other, wherein the first of said objects comprises a first connecting means and the second of said objects comprises a second connecting means, whereby said temporary connection is established by the two connecting means being brought together and connected to each other, wherein the device further comprises a movable first robot, arranged to continuously displace the first connecting means relative to the first object, and a control means, arranged to control the movements of the first robot and as a result the said displacement of the first connecting means relative to the first object, wherein the device further comprises a sensor arranged to continuously read the relative position between of first object or the first connecting means and the second connecting means while the said objects are moving relative to each other, which device is characterised in that the control means is arranged to, while said first and second objects move relative to each other, continuously control the first robot so that the first connecting means is displaced relative to the first object and up to the second connecting means, and there connects to the second connecting means so that said temporary connection is thus established.

Furthermore, the invention relates to a method for providing a temporary connection between two objects that are movable in relation to each other, wherein the first of said objects comprises a first connecting means and the second of said objects comprises a second connecting means, wherein said temporary connection is established by the two connecting means being brought together and connected to one another, wherein a control means continuously controls the movements of a movable first robot so that the first connecting means is thereby displaced relative to the first object, wherein a sensor means continuously reads a relative position between the first object or the first connecting means and the second connecting means while said objects are moving relative to each other, which method is characterised in that, while said first and second objects move relative to each other, the control means continuously controls the first robot so that the first connecting means is displaced relative to the first object and up to the second connecting means, and there connects to the second connecting means so that said temporary connection is thus established.

In the following, the invention will be described in closer detail, partly in connection to the accompanying drawings, in which FIG. 1a illustrates a first embodiment of a device according to the invention, from the side;

FIGS. 2a and 2b illustrate a third embodiment of a device according to the invention from above and from the side, respectively;

FIGS. 1a and 1b show two respective diagrams of respective preferred embodiments of devices according to the present invention. FIGS. 1a and 1b share reference numbers for corresponding parts.

Figure 1A:
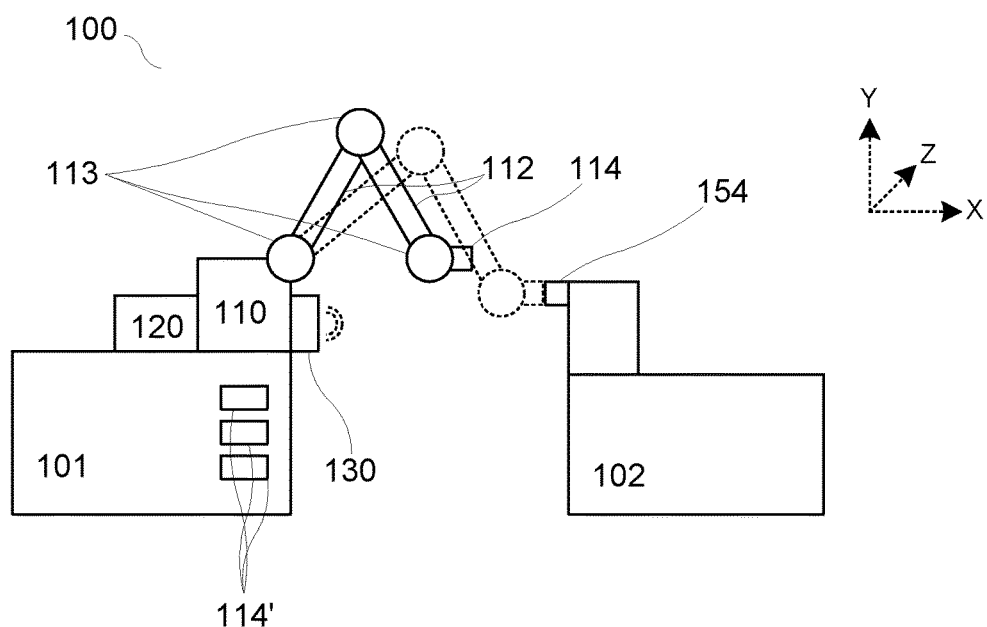

The device 100 is thus arranged to provide a temporary connection between a first 101 and a second 102 object, which are movable relative to each other. The first 110 of said objects comprises a first connecting means 114, and the second 102 of said objects comprises a second connecting means 154. The said temporary connection is established by the two connecting means 114, 154 being brought together and connected to each other.

A connection in the sense of the invention does not only, preferably not primarily, preferably not at all, constitute a mooring of or between the objects, but aims at transferring a medium or energy from one object to the other. See below for examples.

The device 100 further comprises at least one mobile robot 110, arranged to continuously move the first connecting means 114 relative to the first object 101, and a control means 120, arranged to control the movements of the robot 110 and thus said movements of the first connecting means 114 relative to the first object 101.

Additionally, the device 100 comprises a sensor means 130, arranged to continuously read a relative position between the first object 101 or the first connecting means 114 and the second connecting means 154 while the two objects 101, 102 move relative to each other.

Figure 1B:
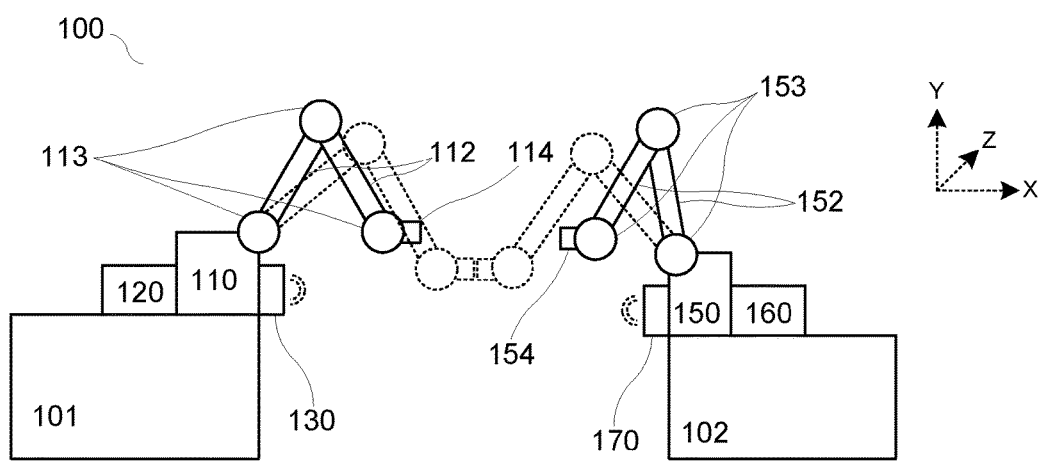
FIG. 1b illustrates a second embodiment of a device according to the invention, from the side.

According to the invention, the control means 120 is arranged to, while said first and second objects 101, 102 move relative to each other, continuously control the movements of the robot 110 so that the first connecting means 114 is displaced, in relation to the first object 101 and up to the second connecting means 154, and there connects to the second connecting means 154, so that said temporary connection thereby is established. FIGS. 1a and 1b both illustrate, using broken lines, the situation when the temporary connection has been established.

The different elements 110, 120, 130 are in communication with each other.

Thus, the first connecting means 114 is movable relative to the first object 101, via the robot 110. In FIGS. 1a and 1b, the robot 110 is illustrated with a number of rigid segments 112 that are movable by arranged joints 113, but it will be appreciated that other types of robots can be used, such as traverse or crane robots, see below. Since the sensor means 130 is arranged to read the relative position of the second connecting means 154 relative to the first connecting means 114, or in relation to the first object 101, and as a result, since the robot 110 can give feedback regarding a position of the connecting means 114 relative to the object 101, indirectly in relation to the first connecting means 114, the control means 120 can transmit signals to the robot 110 in order to displace the first connecting means 114 in a direction towards and up to the second connecting means 154, to a position in which the said temporary connection can be established.

In FIG. 1b the likewise preferred alternative is illustrated that also a second robot 150 is used, in combination with a control means 160 and a sensor means 170. The robot 150, the control means 160, the sensor means 170, the segments 152 and the joints 153 correspond to and have the corresponding function as the robot 110, the control means 120, the sensor means 130, the segments 112 and the joints 113, respectively. The robot 150 is thus arranged to move the connecting means 154 relative to the object 102; the sensor means 170 is arranged to continuously read a relative position between the object 102 or the connecting means 154 and the connecting means 114 while the objects 101, 102 move relative to each other; and the control means 160 is arranged to control the movements of the robot 150 and thus the said displacement of the connecting means 154 relative to the connecting means 114.

Thus, the robots 110, 150 cooperate in this case, in order to together cause the connecting means 114, 154 to approach each other and to assume a position relative to each other in which the connection can be established. The cooperation can be achieved by the control means 120, 160 acting independently of each other, or by the control means 120, 160 communicating with each other, in an as such known manner, such as using wireless Internet, in order to coordinate the displacement operation. What is said in the following regarding a device with a single robot applies mutatis mutandis to a configuration in which two robots work together as is exemplified in FIG. 1b.

An important aspect of the invention is that the first connecting means 114 is moved up to the second connecting means 154, and there connects to the second connecting means 154, while said first and second objects 101, 102 move relative to each other. In other words, the objects 101, 102 are not only movable relative to each other, they actually move while the connecting means 114, 154 are brought together, and preferably also while the connection is established, either by the object 101, the object 102 or both moving relative to a fixed coordinate system.

Such a device makes it possible for a connection to automatically be established between objects of different types that are movable relative to each other, which in many such cases can lead to significantly improved security and/or comfort for an operator of one 101 and/or the other 102 of said objects.

Furthermore, the use of such a device, by means of the sensor means 130, the control means 120 and the movable robot 110, may result in that a connection can be established even before the objects 101, 102 have reached a stable position relative to each other. As a result, a much more flexible way to establish a temporary connection between the objects 101, 102 is achieved, which flexibility in turn can be used to increase the efficiency of transmitting a medium between the objects 101, 102.

Such efficiency gains and other advantages will be more fully understood by the subsequent part of the description, in which the invention will be made further concrete by means of a number of exemplary embodiments.

As regards the guide means 120, it may be of any suitable type, and preferably comprises a microprocessor, a digital memory, at least one input for measurement data or position data and at least one output for controlling the movements of a robot. A control software is arranged to be executed on the control means hardware and thus to perform the said control as such, based on a number of predefined rules and patterns. The control device is in contact, for digital communication of information, with other parts of the device 100, such as with the sensor means 130 and the robot 110.

The sensor means 130, which is arranged to sense the position of the connecting means 154 in relation to the object 101, may likewise be of different types. Preferred sensor means include such sensor means that operate without contacting the connecting means 154, such as optical sensor means, comprising one or more cameras in combination with an image analysis software arranged to identify certain previously known visual markers on the connecting means 154, such as text indicating the identity of a craft, such as the IMO number (International Maritime Organization) of a vessel, or known structures that are located at known positions relative to the connecting means 154; laser based or ultrasonic based detection means, arranged to scan a surface comprising the connecting means and/or to identify a structure of the surface and/or a distance to such a surface; an infrared camera; or the like. Radar technology, long-range RFID or the like can be used to identify an approaching object, which can thereafter for example be identified visually.

It is preferred that the sensor means operates in two stages, the first stage involving the detection, and preferably also identification, of an approaching vehicle. This may be performed using radar, AIS, long-range RFID or by other means, above. The second step involves visually identifying the location of the vessel, and especially the position of one or more connecting means on the vessel.

Examples of suitable means for such visual identification include an industrial camera, preferably for detecting infrared light alternatively equipped with its own light source such as a laser light source, such as the camera IPR438ESX commercially available from the company Meritilin, Taiwan. Such a camera may for example be used together with a piece of software such as that commercially provided by Tordivel AS, Norway, under the trade name Scorpion Vision.

It is preferred that the objects 101, 102 are movable relative to each other, and also that they move relative to each other during the said movement of the means 114 relative to the means 154, along at least two dimensions of motion, such as across a surface, preferably along at least three dimensions of motion X, Y, Z, such as in a space. As to the control means 120, it is preferably arranged to control the movement by the robot 110 of the means 114 along at least two, preferably three, dimensions of motion X, Y, Z, and most preferably at least along as many dimensions as the number of dimensions along which the objects 101, 102 move relative to each other during said movement. This also applies to the number of operating dimensions along which the robot can displace the connecting means 114.

FIG. 2a, from the top, and 2b, from the side, illustrate an exemplary embodiment of the invention in which one 201 of the two objects is fixedly arranged and comprises a robot 210, while the other object 202 is movable relative to the first object. In the present example, one 201 of the objects is permanently installed on a quay 203, and the other object 202 is permanently installed on a boat 204 or a vessel that floats on a water surface next to the quay. It is preferred that the connection that is established in accordance with the above described is a connection with the purpose of delivering, between the objects 201, 202, electrical energy, fresh or waste water and/or powder, gaseous or liquid supplies such as methane gas, and food. For example, the electrical energy may be supplied to the vessel 204 via an electrical connection and electrical cables; fresh water may be supplied to the boat 204 via a pressurized water supply and water pipes; waste water may be removed from the vessel 204 via a connection which comprises an opening in which a hose is inserted into and sucks the waste water out from the vessel 204; or supplies may be delivered to the boat 204 via a corresponding connection, but wherein the hose which is inserted into the opening is arranged to deliver such supplies into the boat 204.

The first object 201 can also be fixedly mounted on a floating pier, or on a service boat. In these cases, hence, both objects 201, 202 are movable relative to each other and to the fixed coordinate system (X, Y, Z). In all these cases, the connection may be established despite the fact that, and while, the objects 201, 202 move relative to each other, which facilitates efficient delivery of the above types of substances at piers and in harbours.

The connecting means 214 and 254, as well as the control means 220 and the sensor means 230, are similar to the above-described parts 114, 254, 120 and 130, as is the fixed coordinate system (X, Y, Z).

For example, when the device 200 is installed for use at a quay, but also in other embodiments, when the position of the second object can vary over a relatively broad area in relation to the first object at the time of a desired connection between the objects, it is preferred that at least one of the robots is fixedly mounted on a coarse adjustment device, by means of which the robot 210 and/or the first connecting means 214 is displaceable in at least one direction, preferably at least two directions, relative to the first object 201. The controller 220 is then arranged to control the position of the coarse adjustment device relative to the second object 202, and also to control the movements of the robot 210, relative to the coarse adjustment device, to thus fine tune the position of the first connecting means 214 relative to the second connecting means 254.

Such a coarse adjustment device enables the device 200 to be quickly adapted to the general position for the establishment of the connection, and can thereafter establish the connection with high efficiency and accuracy once the coarse adjustment is completed. It is also preferred that the fine tuning with the help of the robot 210 is commenced before the coarse adjustment is completed, so that the fine-tuning can be completed with satisfactory precision only a short time after the coarse adjustment is completed. This is preferably done by the control means 220 using existing information regarding the final position for the coarse adjustment as a basis for an approximate calculation in advance of the movements called upon by the fine-tuning.

The coarse adjustment device preferably comprises a linear path 215a along which a carriage 215b carrying the robot 210 can be brought, by means of electric motors and as controlled by the control means 220, in FIGS. 2a and 2b along the Y direction.

In a particularly preferred embodiment, also illustrated for exemplary purposes in FIGS. 2a and 2b, the first object 201 is fixedly installed adjacent a boat or ship sea-lock, where the water surface level is variable (Z direction). In this case, preferably the fixed system object 201 further comprises a height adjustment means on which the robot 210 is mounted. The height adjustment means comprises preferably a platform 2151, supported by an electrically driven hoist means 215e, which is controlled by the control means 220, and which in turn is supported by a carriage 215b of the said coarse adjustment device. The platform 215f then carries the robot 210, which in turn is used for the fine-tuning.

In the illustrated example, the coarse adjustment device further comprises a carriage 215d, which rests on the carriage 215b and is supported by an electrically driven linear displacement device 215c by which the carriage 215d may be linearly displaced relative to the carriage 215b in the X direction, under control of the control means 220.

In other words, the robot 210 is itself displaceable in three perpendicular, or substantially perpendicular, directions, in the illustrated example the X-, Y- and Z-directions. It is also possible for the paths 215a, 215c and the hoist 215e to follow respective curvilinear paths, depending on the geometric conditions at the quay 203 or the location where the connection is to be established.

It is further preferred, in the said example with a sea-lock, that the control means 220 is arranged to continuously control the position of the robot 210 in the vertical direction (Z-direction), by controlling the said height adjustment means to correspond to the actual level of the water surface. This control is preferably conducted during the abovementioned coarse adjustment phase.

It is particularly preferred that the control means 220 is arranged to, in a first step, control the height adjustment means to a position vertically corresponding to the current level of the water surface, and in a second step to control the height adjustment means to maintain the controlled height position, irrespective of any ongoing water surface level changes, while the connection is being established and maintained. This may mean for example that a ship arrives at the robot 210, which is then coarsely adjusted to the correct position in the Y direction, to correspond to a current position of the connecting means 254, as well as in the Z-direction, depending on the current water surface level. While the connection is being established, and also thereafter, the water level rises or sinks, as a result of the normal operation of the sea-lock, whereby the Z-position of the robot 210 is continuously coarsely adjusted to substantially correspond to the water surface level in each moment. This means that the connection can be established and maintained regardless of the current operating status of the sea-lock, providing better opportunities for planning and efficiency of maintenance and service of boats and ships passing through and being present at the sea-lock.

In FIGS. 2a and 2b, the local action radius 216a of the robot 210 is illustrated in the current, coarsely aligned, position of the robot 210. Also illustrated is the robot's 210 global action radius 216b, when also taking into account the possibility of coarse adjustment of the robot 210. It is noted that the coarse adjustment device extends the total action radius of the robot 210.

As mentioned, in FIGS. 2a and 2b, the object 202 is fixedly installed on a boat 204, which boat 204 can be seen as a vehicle which is movable on a surface (the water surface). In this case, the surface itself is movable, in that the water level varies as a result of waves, tide, sea-lock activity and so on. The situation is different on land, where the ground forms a solid surface, and wherein the vessel is a land-based vehicle such as a car, a bus, a truck, a train or the like.

When one of the objects is permanently installed on the vehicle, it is preferable that the second object is a permanently installed station for, through the connection that is established between the objects and between the objects, supplying electrical energy, fresh or waste water and/or supplies, or for collecting and removing exhaust gases from an exhaust outlet of the vehicle in question. The latter is for example useful in parking garages, workshops and the like, where a connecting means in the form of an exhaust pipe of an arriving vehicle automatically can be connected by means of a robot, to a corresponding connecting means in the form of a suction muff for extraction of exhaust fumes from the exhaust pipe for disposal. In this case, the robot which controls the position of the suction muff relative to the position of the exhaust pipe can for example be arranged suspended in a coarse adjustment device comprising a linear displacement path which runs along the ceiling along a roadway in the garage or workshop.

As mentioned above, in alternative embodiments, the two objects can both be installed on respective vehicles such as floating bridges, boats or ships, floating on a common water surface. As an alternative to this, one of the objects can be permanently installed on the ground or on a building while the other object is installed on a flying craft, or both objects may be installed on respective flying crafts. When the connection is established in these cases, the said respective flying craft is in a respective flying state, and thus above the ground, and the connection is a connection between the objects to deliver electrical energy, fresh or waste water and/or supplies. In a particularly preferred embodiment, one of the objects is an electrically powered aerial vehicle, such as a so-called drone, such as an unmanned helicopter, the battery of which is charged by electrical power supplied through the connection from a charging station installed on the ground, on a building or on a flying vessel carrying a charging station. For example, such drones may be used to distribute water for firefighting, or different pesticides agents, fertilizers and so on as used in agriculture.

Figure 3A:
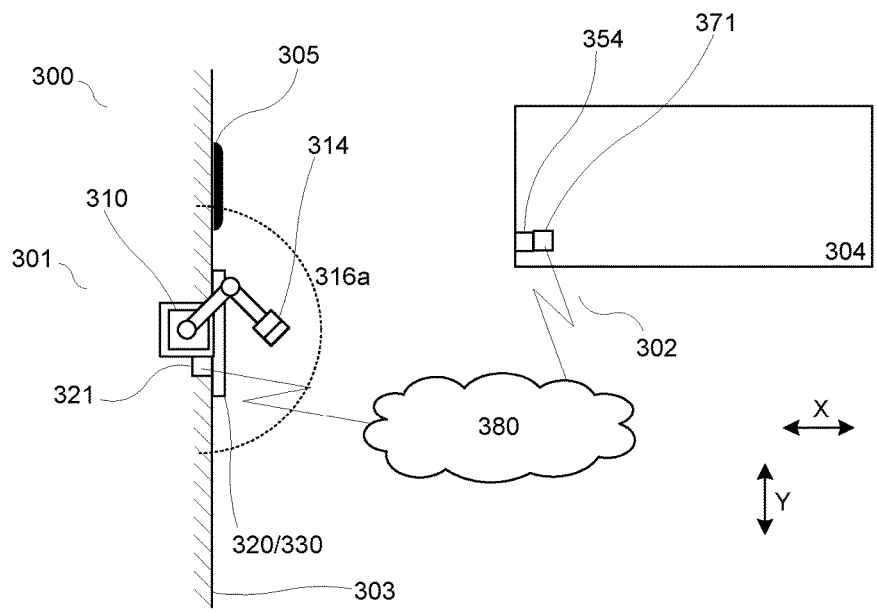
FIGS. 3a-3c illustrate three different successive steps performed using a fourth embodiment of a device according to the invention, from above.
Figure 3B:
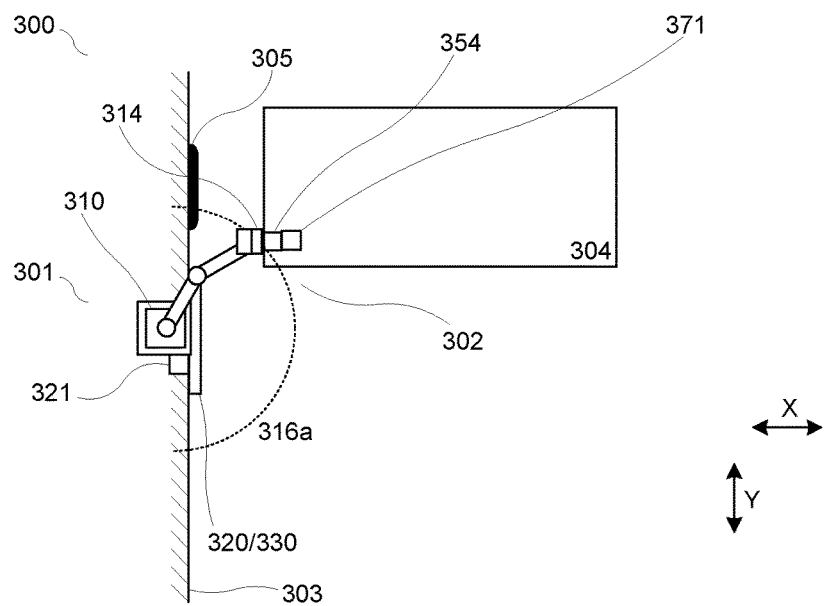
Figure 3C:
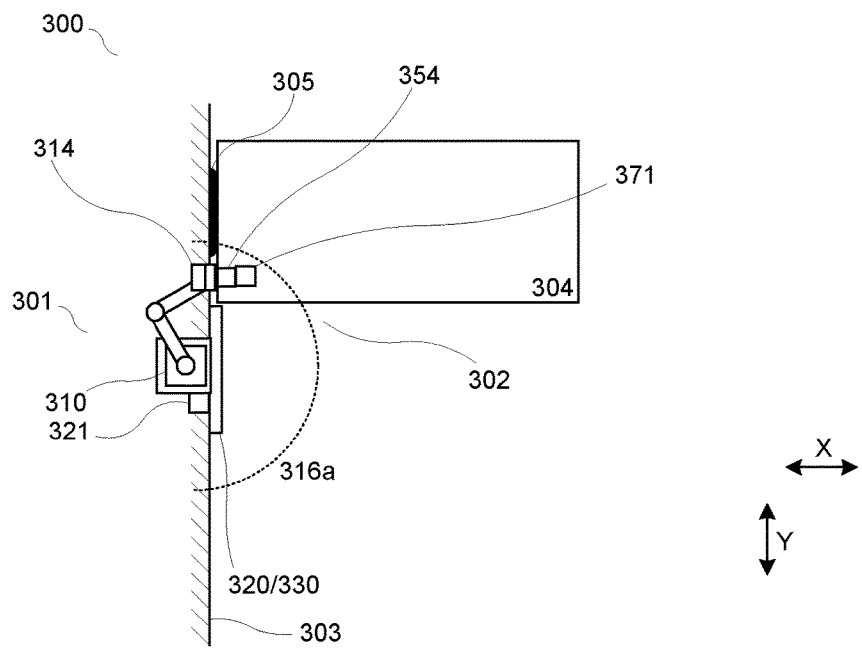

FIGS. 3a-3c illustrate a particularly preferred embodiment, in which the objects 301, 302 can assume a parked position (FIG. 3c) relative to each other, in which the objects are arranged so closely spaced that the robot can maintain the connection, and wherein the objects may also assume a different, separate position (FIG. 3a), in which the objects are at a distance from one another, preferably at such a distance that it is not possible to establish the connection because the incoming object's connecting means is beyond the reach of the robot connecting means. It is preferred that at least one of the objects in the parked position moves about a respective equilibrium position or a centre of motion relative to the other object, and that such equilibrium positions or centres of motion are fixed relative to each other or to the position of the second object in the parked position. Examples of equilibrium positions or centres of motion include when a vessel, which is moored using mooring lines, moves within its limited room for manoeuvre next to the immobile quay; when a helicopter hovers above a charging station arranged on solid ground; and when two boats are moored one to the other and move within the limited relative room for manoeuvre allowed by the mooring.

In a first example of such a configuration, a service boat with a connection robot according to the invention, approaches and moors to a vessel comprising a fixedly mounted connecting means for supplying fresh water. In this case, the parked position is constituted by the boat being stably moored at the ship, but where both the service boat and the ship moves around a respective centre of motion, which centres of motion are immobile in relation to each other. The separated state is constituted by the service boat not yet having reached the ship, but is located at a distance therefrom.

In a second such example, a car arrives at a repair shop, and is connected to an exhaust fume collecting connecting means mounted on a robot according to the above, whereby the car, after the entrance into the workshop, is stationarily parked above a working pit. The parked position is thereby reached when the car reaches an immobile position above said working pit, whereby both objects therefore are immobile relative to each other, and the separated position is constituted by that the car not yet having come to a standstill above the working pit, but is arranged at a distance therefrom.

The third example is when a boat or a ship arrives at a quay at which it is to be moored or lie quietly otherwise, and where a connection is established between the boat or ship and a permanently installed device on the quay. In such case, the parked position is constituted by the boat or ship lying still beside the quay, whereby the boat or ship, therefore, revolves around a centre of motion which is immobile relative to the fixedly installed robot on the quay. The separated state, finally, is constituted by the boat or ship being at a distance from this parked position.

FIGS. 3a-3c illustrate a device 300 according to the said third example, wherein an object 302 according to the invention is fixedly mounted on an electrically propelled vehicle ferry 304. The object comprises a connecting means 354 arranged to supply electrical current through the connecting means 354 to a battery arranged to provide the propulsion means of the ferry with energy for forward operation. The object further comprises a wireless communication means 371 for wireless communication with a corresponding wireless communication means 321 disposed by the quay 303 and as part of the second object 301. The communication means 371, 321 are conventional as such, and may for example be a Bluetooth connection; means in themselves not primarily intended for mutual communication but rather for identification, such as an RFID connection or the like; an acoustic connection or a wireless internet connection. 380 indicates a wireless network or a wireless communication link through which communication can take place, such as the Internet.

The object 301 further comprises a permanently installed robot 310, a sensing means 330 and a control means 320; and the quay 303 comprises a resilient shock absorber 305 or the like, against which the ferry is pressed in order to lie still in the parked position. The directions X and Y are the same as in the other figures.

The objects 301, 302 are thus arranged to be brought from said separated position to said parked position. The control means 320 is further arranged to control the robot 310 so that the connection is established while the objects 301, 302 move from the separated position towards the parked position, and before they reach the parked position.

FIG. 3a illustrates such a separated position, in which the ferry 304, which for example is heading towards the quay 305 to drop off and take up new vehicles for transport across a watercourse, is located so that the connecting means 354 is out of the robot's 310 reach 316a for contact with the connecting means 314. FIG. 3b illustrates the situation at the time of establishment of the connection. The ferry 304, and thus the object 302, has not yet arrived at its parked position adjacent the quay 303, where vehicles can be dropped off and taken up, but is in such a position that the connecting means 314 just reaches the connecting means 354 so that connection is possible when the robot 310 is displaced to an extreme position.

By thus utilizing the robot's 310 freedom of movement in combination with the sensing of the sensor means 330 and the logic of the control means 320, an electric connection can be accomplished earlier than had been possible with prior art technology. This difference is in many cases essential. When it comes to an electric vehicle ferry, for example, the last meters of travel before the ferry arrives at the quay may take tens of seconds, while the total charging time ashore may involve less than 10 minutes. The additional charging time achieved by the invention thus represents a significant share of the total charge time.

Correspondingly, it is further preferred that the control means 320 is arranged to control the robot 310 so that the connection is broken during the movement of the objects 301, 302 from the parked position and, after the objects 301, 302 have left the parked position, to a second separated position, said second separated position being similar to that described above and wherein the objects 301, 302 again are located at a distance from each other.

This can be done in several different ways, as illustrated in FIGS. 4a-4d, all of which, with common reference numerals, illustrate an arm or a segment 412 of a robot 410 of an object 401, which robot 410 controls the position of a connecting means 414 arranged to, together with a connecting means 454 arranged on another object 402 which is movable relative to the first object 401 even after the connection has been established, establish the temporary connection. The connector 414 is supported by a supporting part 416 of the robot 410, and the connecting means 454 is supported by a supporting part 456 of the object 450.

Figure 4A:
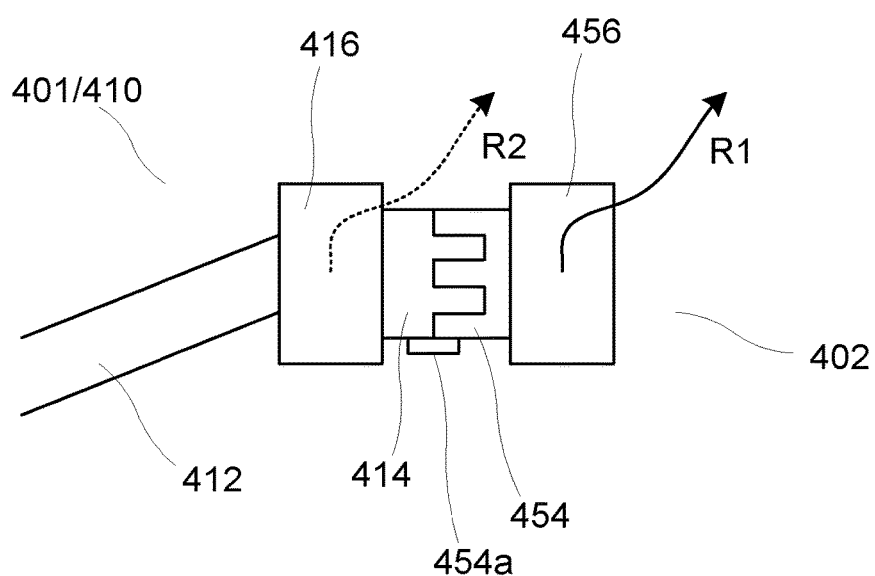
FIGS. 4a to 4g illustrate various types of connections, from the side.

FIG. 4a illustrates the case that, after the connection is established, the connecting means 414 is maintained at the connecting means 454 by means of a locally arranged fastening means 454a, which for instance, depending on the connection type, can be constituted by cooperating snap-lock means or magnetic means on the respective objects 414, 454. In this position, the control means (not shown) will not actively control the movements of the robot 410, instead the movements R2 of the connecting means 414 will passively follow the movements R1 of the connecting means 454. Once the connection is to be broken, the object 401 and/or the object 402 causes the engagement of the attachment means 454a to be released, whereby the connecting means 414 may be brought out from the connection and away from the connecting means 454. For many types of connections, this is a simple and therefore preferred way.

In an alternative embodiment, the control means is instead arranged to actively and continuously control the movements of the robot 410 so that the part 416 of the robot 410 which is arranged to manoeuvre or maintain the connecting means 414 is stationary relative to the connecting means 454.

Figure 4B:
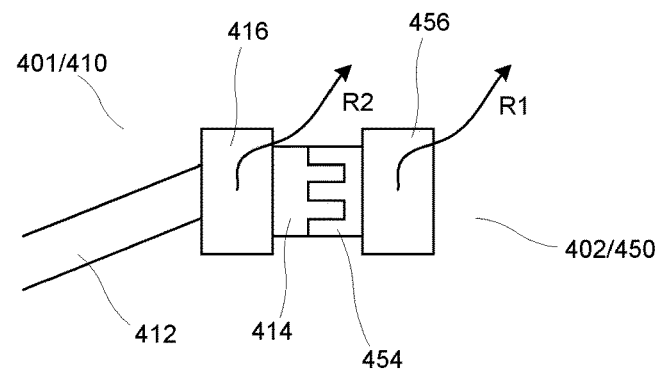

A first example of this is illustrated in FIG. 4b, in which the control means is arranged to actively and continuously control the robot 410 so that the connecting means 414 is stationary, while the connection is maintained relative to the connecting means 454. In other words, the movements R2 of the object 414 will actively follow the movements R1 of the object 454. When the connection is to be broken, the control means may cause the part 416 to simply bring the connecting means 414 away from the connecting means 454. In this case, no fastening means is required, although it is possible to combine the embodiment of FIG. 4a with that of FIG. 4b. It is preferable that the robot maintains a certain pressure between the connecting means 414, 454.

Figure 4C:
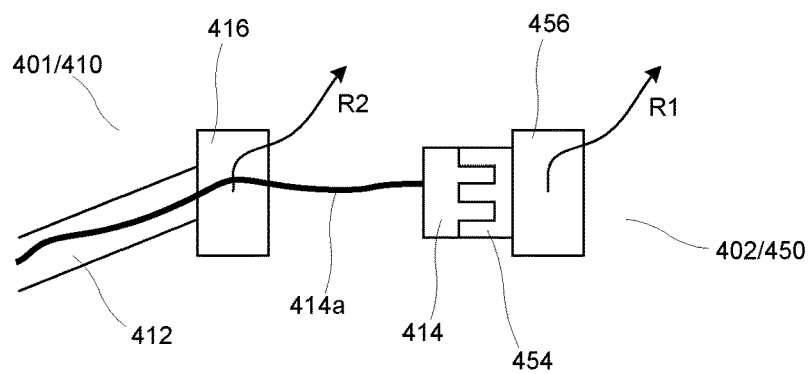

A second example of this is illustrated in FIG. 4c, wherein the part 416 is arranged to release the connecting means 414 after the connection has been established, and wherein the control means then actively and continuously controls the movements of the robot 410 so that the movements R2 of the part 416 follow the movements R1 of the connecting means 454 relatively closely, such as at most 0.2 meters away. The actual connection is secured with a cable 414a or the like, which runs from the connecting means 414 and to the object 401, and through which electricity, fresh water or the like can be supplied. Once the connection is to be broken, the control means may control the position of the part 416 relative to the means 454 so that the part 416 can be re-engaged with the means 414 and then bring the latter out from the connection and away from the means 454. It will then be possible to break the connection at short notice and in a controlled manner, since the part 416 can always be kept closely to, and synchronized with respect to speed with, the means 414.

Thus, the robot 410 is in this case arranged to, after the connection has been established, free itself from the connecting means 414 so that the connecting means 414 is then freely movable, not counting said active control, within at least a limited area or volume relative to the robot 410.

Figure 4D:
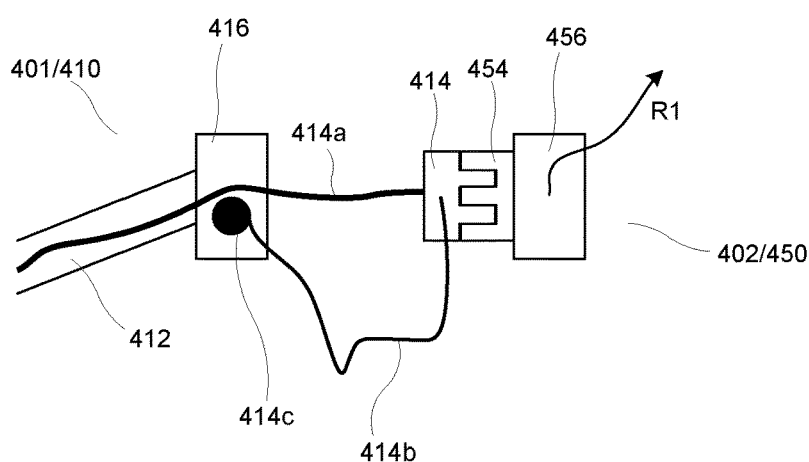
Figure 4E:
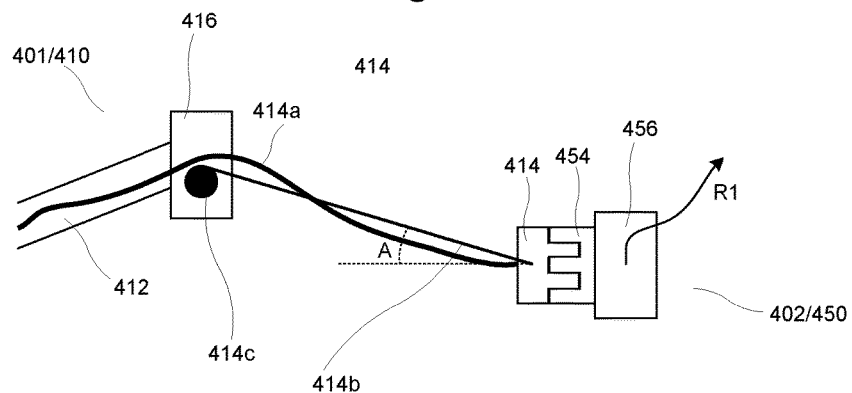

Another embodiment that also involves such freedom of movement is illustrated in FIG. 4d, wherein the control means is not actively controlling the position of the part 416 or means 414, but the movements R1 of the body 454 are allowed to be independent, or at least independent within a limited volume, by the movements of the robot 410. Instead, the part 416 has released the means 414, in a manner corresponding to that described above in connection to FIG. 4c, and a flexible fastening means 414b, preferably comprised in the robot 410, connects the robot 410 to the connecting means 414. The connection is secured, as is the case in FIG. 4c, by means of a cable 414a or the like. When the connection is to be broken, this is then done by way of the fastening means 414b being arranged to, using a pulling force, break the connection when the connected objects 401, 402 move from each other, by being arranged to be stretched and then pulling the means 414, 454 apart. It is preferred that a collecting means, for example comprising a reel 414c, is arranged to capture the means 414 and to return it into appropriate engagement with the part 416 in order to establish a subsequent connection. As illustrated in FIG. 4e, it is also preferred that the control means is arranged to, before the breaking of the connection, control the robot 410 to manoeuvre the connecting means 414 into a position in which the angle A between the stretched fastening means 414b and a pulling apart direction of the connecting means 414 out of engagement with the connecting means 454 at the time of the said break falls within a predetermined range within which damages are not risked for any of the connecting means 414, 454 as a result of said applied pulling force and said pulling apart.

Figure 4F:
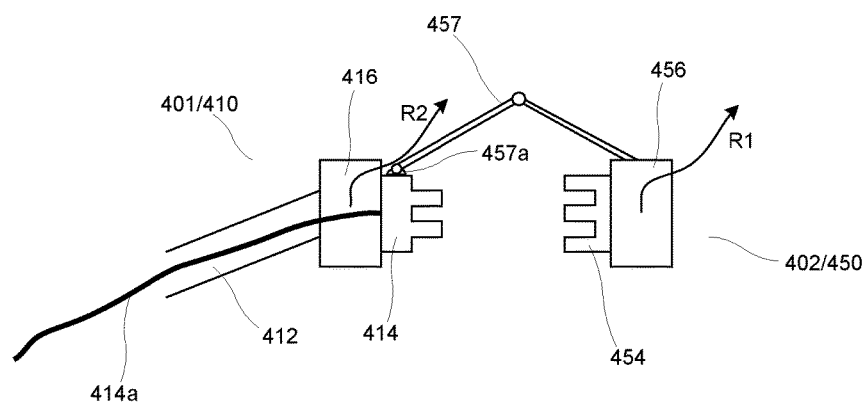
Figure 4G:
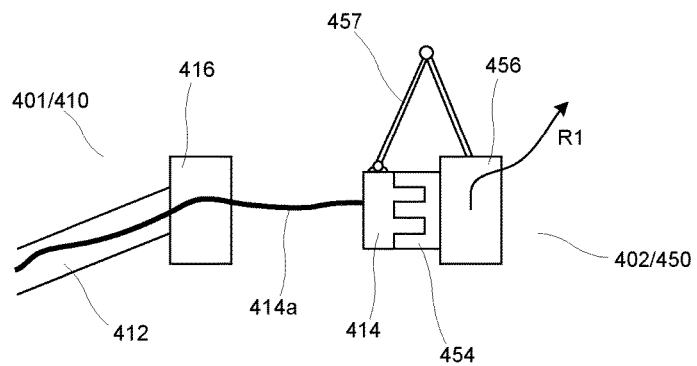

FIGS. 4g and 4f show, in sequence, another preferred option, wherein the control means first (FIG. 4f) is arranged to bring the means 416 into a position in the vicinity of the object 450, and within reach of a capturing or receiving means 457 of the object 450, which means 457 is arranged to engage with the connecting means 414 and to bring this up to and into engagement with the connecting means 454. Hereby, the means 414 is first loosened from the means 416, by the means 416 or the means 457. Thereafter, the control means preferably actively controls the movements R2 of the means 414 so that the means 414 is held stationary relative to the means 457. Alternatively, a control means of the object 450 controls a gripping means 457a of the means 457 so that it is advanced to and is brought into engagement with the means 414, which thus results in a controlled movement of the gripping means 457a relative to the object 450.

Then (FIG. 4g), the means 457 brings the first connecting means 414 up to and into engagement with the second connecting means 454, so that the connection is thus established. Once the connection is to be broken, this can occur in any of the ways described above.

Thus, in this embodiment it is the first robot 110 that controls and/or hands over the connecting means 114 to the second robot 150, see FIG. 1b. The second robot 150 then connects the connecting means 114, 154. Thus, for example, a custom robot installed on a vehicle can by itself handle complicated connection procedures comprising doors or the like. Moreover, the overall working range across which the connection may be maintained is extended, and the first robot 110 may assist in handling the wiring/tubing when the distance between the robots 110, 150 becomes large.

FIGS. 1a-1b and 3a-3c illustrate a respective robot 110, 310 fixedly mounted on a support, which robot comprises at least two, preferably at least three parts, the relative angles of which can be controlled. An example of a type of robot that is useful for this and other types of applications of the present invention is the one sold by ABB under the trade name IRB 2600.

FIGS. 2a-2b illustrate, on the other hand, a robot 210 which includes at least two, preferably at least three parts, which are displaceable relative to each other. Such a robot preferably also includes, in addition to the displaceable sections, at least one, preferably at least two, preferably at least three, parts, the relative angles of which can be controlled. Examples of suitable robots with movable parts include the one sold under the trade name IRB 6620LX.

In general, it is preferred that the robots described herein have several axes and are servo controlled, and are preferably also of standard type.

These exemplifying robots can also advantageously be used in modified form, such as an IRB 2600 mounted on a pair of traverse cranes and a hoist, as illustrated in FIGS. 2a-2b, or an IRB 6620LX with extended arm beams and supplemented with several gripping means and tools for different types of connecting means.

In general, it is preferable to use linear traverses similar to the device 215e when larger vessels moor at the quay with the long side towards the quay, while robots mounted permanently on the quay can advantageously be used when smaller boats moor with the bow or stern to the quay.

Figure 5A:
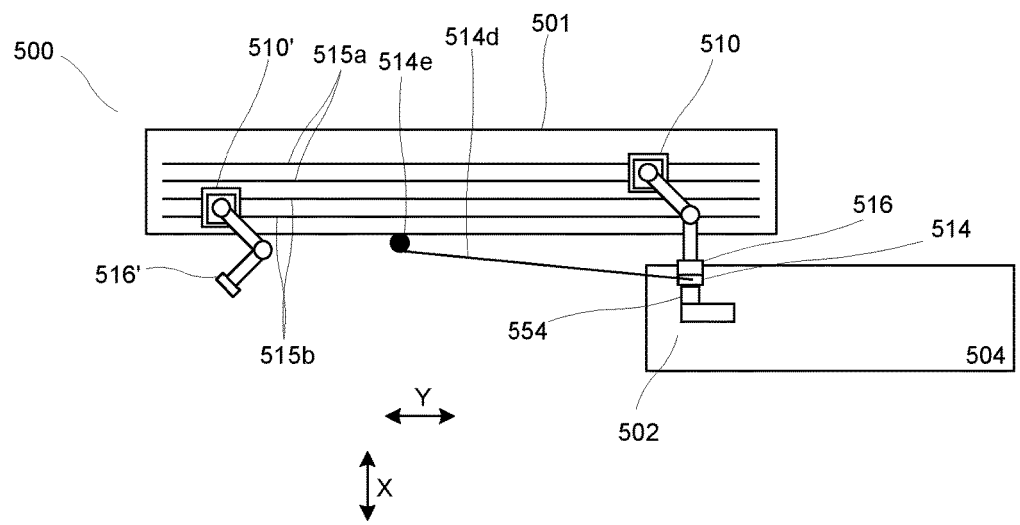
FIGS. 5a-5c illustrate three different successive steps using a fifth embodiment of a device according to the invention, from above.
Figure 5B:
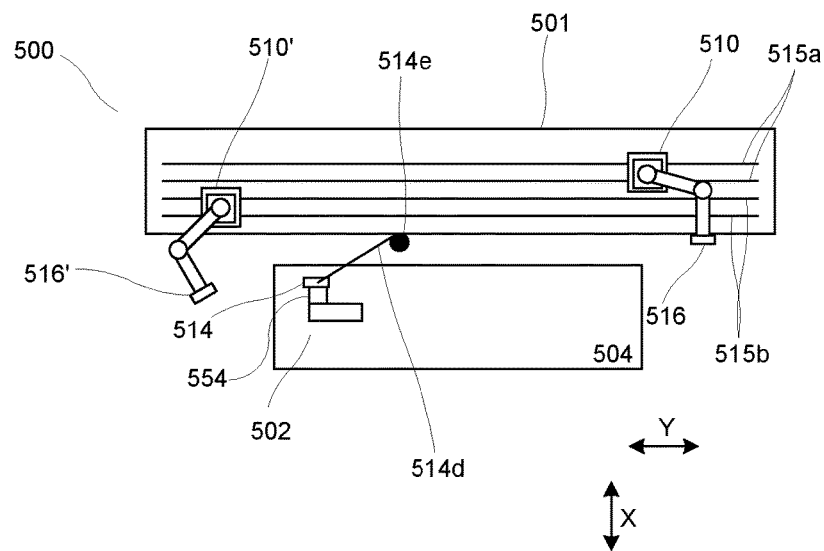
Figure 5C:
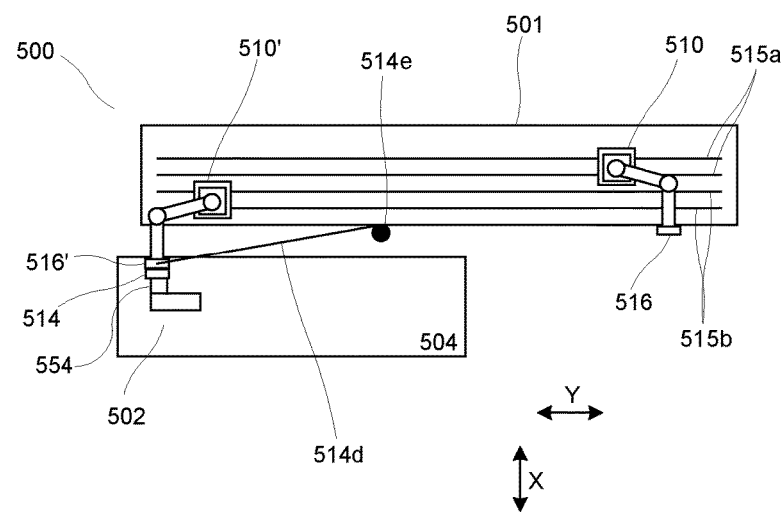

FIGS. 5a-c illustrate, for exemplifying purposes, a further preferred embodiment, in which an electrically propelled bus 504, on which an object 502 of the type described above is permanently installed, travelling along a bus route passes another object of the type described above in the form of a bus stop 501 equipped with a charging station for a battery arranged in the bus 504. The bus stop 501 is further equipped with two cooperating robots 510 and 510', which themselves, and also their position along with respective rails 515a, 515b, are controlled by a control means (not shown) similar to the above described control means. The robots 510, 510' are provided with respective parts 516, 516' for engaging with and supporting a connecting means 514 intended to connect an electric cable 514d to a connecting means 554 on the bus for the transfer of electrical energy to the bus 504 battery while the bus 504 is present at or near the stop 501. The cable 514d is held taut by a per se conventional stretching means 514e.

A device 500 such as the one illustrated in FIGS. 5a-5b comprises at least two movable robots 510, 511', both of which in a preferred embodiment are arranged to cooperate with each other, so that one of them is arranged to establish said connection and then to free itself from the connecting means 514, while another one is arranged to subsequently break the connection, preferably by again grabbing hold of the connecting means 514 and bringing it away from the means 554.

When the connecting means 554 of the object thus comes within reach of the robot 510 (FIG. 5a), the robot 510 brings the connecting means 514 forward, in a manner corresponding to that described above, up to the connecting means 554, and there establishes the connection, whereby the charging commences. The connection is preferably established, as above, before the bus 504, and thus the object 502, finally have arrived at a parked position adjacent the stop 501, for instance when the bus is about to swing in towards the bus stop but is within reach of the robot 510.

Thereafter, the robot 510 releases the engagement with the connecting means 514, which is thereafter supported by the engagement with the connecting means 554 while the bus is moving forward towards a parked position (FIG. 5b)

adjacent to the bus stop 501. Meanwhile, the battery of the bus 504 is charged via the cable 514*d*.

When the bus 504 is again about to leave the bus stop 501 (FIG. 5*c*), the robot 510' brings the part 516' forward to the connecting means 514 and engages with the same, breaks the engagement between the means 514 and means 554 and removes the means 514 from the means 554. This preferably occurs after the bus 504, and thus the object 502, has left its parked position at the bus stop 501 and is on its way out from the bus stop 501, but while the connecting means 554 is still within reach of the robot 510'.

The robot 510' can then, for example, switch places with the robot 510, by the robots 510, 510' sliding along the rails 515*a*, 515*b*, after which the robot 510' is prepared to establish a connection with a next bus whose batteries must be recharged.

It is understood that a similar system 500 also can be installed, for example, at a red light in a traffic intersection, so that electric vehicles can be connected and charged during the time they arrive, wait for a green light, and re-start driving. By means of the invention, vehicles in this type of situation are as a result provided with maximum charging time even during short stoppages.

One of the robots 510, 510' may also, as an alternative, establish the connection in a first position along the rails 515*a*, 515*b*, then follow the connecting means 554, again along the rails 515*a*, 515*b*, when the bus 504 moves forward along the bus stop 501, and then break the connection at a different position along the rails 515*a*, 515*b*. This also means that the connection can be maintained during a maximally prolonged time.

Instead of rails 515*a*, 515*b*, for example a traverse crane or a cable transport system can be used.

Another embodiment in which a wheeled vessel, which is movable on the ground, is to be connected to an object that is likewise located on the ground, is that the first object is a so called terminal tractor or other towing vehicle, and the second object is a trailer or the like. Terminal tractors are used to quickly and efficiently move trailers in harbours, terminals, transshipment terminals and so on. In this case, a robot is permanently mounted on such a terminal tractor, and arranged, in a manner similar to that described above, to connect and possibly also release the terminal tractor to and from a trailer to be moved. This therefore includes managing connecting means and tubing for a pneumatic brake system, as well as the connecting means and cabling for electrical systems such as braking systems, brake lights, tail lights, turn signals, etc. Using such a system, the connection of the terminal tractor to trailers can be made quickly and with good safety. In connection to the connection itself, such a system may also be arranged to, via said connection, automatically verify the equipment, such as the condition of the brake system.

When the driver thus drives/backs the terminal tractor to the trailer in question, the said robot is arranged to automatically locate connecting means on the trailer, and then to automatically connect hoses, cables and so on to such connecting means even before the tractor and trailer have been connected via the so-called "fifth wheel", that is the coupling or coupling disc used to connect the towing vehicle to trailer.

According to a preferred embodiment, the above described sensor means comprises a camera, which in collaboration with image processing software is arranged to be able to recognize which type the connecting means, that the connecting means of the robot is to connect to, belongs to, which type is identified from a number of possible ones for which identifying information is stored, for example, in a database of the sensor means. Identification of the said type takes place by identification of visual characteristics such as the shape of the connecting means in question or predetermined visual markers such as two-dimensional patterns, alphanumeric characters, and so on.

In this case, it is preferred that the device includes a selecting means arranged to, based on the identified connection type of the connecting means in question, choose one of several possible connecting means and use this as the connecting means which is advanced by the robot to the identified connecting means in order to there establish the said connection.

In this case, therefore, the object to which the robot is to connect comprises a set of at least two different connecting means, preferably of standard type, and the robot comprises one or more gripping means arranged to locate and engage with a selectable one of said plurality of connecting means.

This is illustrated schematically in FIG. 1*a*, wherein three different alternative types of connecting means 114', apart from the connecting means 114, are arranged within reach of the robot 110 so that the robot 110 may pick up a connecting means 114, 114' which is of a type corresponding to the connecting means 154, depending on the type of the latter, as detected by the sensor means 130. It is preferred that the robot also comprises a visual sensor means near the connecting means 114, which follows the movements of the connecting means 114 and thus can be brought into a position near the connecting means 154 to facilitate the identification of the type of the said connecting means 154.

Figure 6:
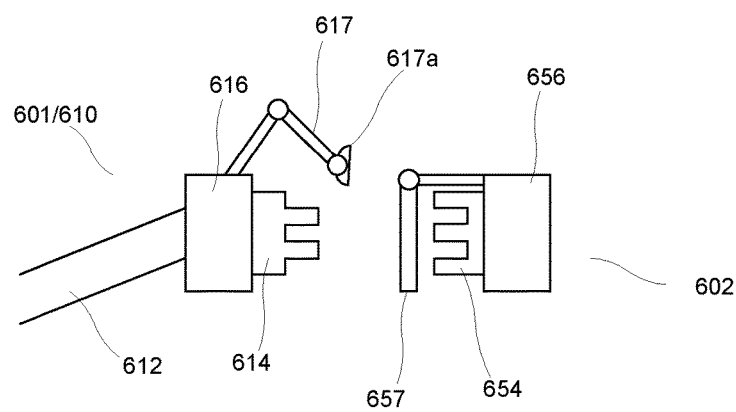
FIG. 6 illustrates an activating means according to the invention, from the side.

FIG. 6 illustrates a further preferred embodiment, wherein a robot 610 comprises a segment 612, a connecting means holding part 616 and a connecting means 614, while an approaching object 602 comprises a connecting means holding part 656 and a connecting means 654. Apart from the connecting means 614, the robot 610 in this case comprises an activating means 617, arranged to activate the connecting means 654, for example by using a suction cup 617*a* to open a door 657 which covers the connecting means 654. The control means is arranged to control the robot 610 to, in a first step, using the activating means 617, activate the connecting means 654, and, in a second step, to establish the connection between the means 614, 654. When the connection is subsequently broken, it is preferable that the activating means 617 again deactivates the connecting means 657, for instance by the activating means 617 holding the door 657 open while the connection is maintained, and thereafter closes the door 657 or allows it to be closed.

Such activating means 617 can be designed in many different ways, depending on the type or types of connecting means 654 to be handled by the system according to the invention. For example, a lid may be screwed off, unlocked, or opened, or made available in other ways, such as using a push button or using digitally transmitted instructions given over a communication link, such as the link 380.

In a particularly preferred embodiment, the device of the invention is arranged to establish the above-described connection only in case that the amplitude and/or frequency of the relative movements of the objects in relation to each other during a certain period of time fall within an acceptable, predefined respective range. In other words, the control means 120 is arranged to control the robot 110 so that it establishes the connection not before the objects 101, 102 are sufficiently stationary in relation to each other for a sufficiently long contiguous period of time.

At the same time, the controller 120 is also arranged to, even before this condition is met, actively and continuously control the movements of the robot 110 so that the connecting means 114 is stationary or substantially stationary relative to the connecting means 154. This leads to that an effective balance can be achieved between the desire for long total connection time and, on the other hand, the requirement for safety for connections that are to be established, for example in severe weather at sea, so that a minimum level of safety can be guaranteed. It is furthermore preferred that the control means 120 is arranged to break the connection prematurely in case the amplitude and/or frequency of the relative movement of the objects 101, 102 exceed predetermined respective values while the connection is maintained, or if the objects 101, 102 for some reason move apart further than a predetermined distance, or if the connecting means 154 is displaced outside of a predetermined safety zone around the object 101, or following specific instructions manually given to the device 100 by operating personnel.

It is also preferred that the information regarding the approaching object 102, such as total weight, current course, acceleration and the like are made available to the control means 120, for example via a communication link such as link 380, and that the control means uses such data to calculate, in advance, an appropriate timing for establishing the connection while maintaining safety.

In this case, the system takes into account the movements of the object as measured by the sensor means 130, and for example the calculated inertia, and the precision and flexibility of the robot, across different parts of its working range, as known ahead of time. Such estimates may for example be constituted by the connection not being established when the approaching object 102 is moving too quickly when the robot is operating in a mode in which the sensitivity to shocks is greater than a certain threshold, which in turn depends on the said speed.

The parameters that can be considered when possible connection timings are pondered will typically vary depending on several factors. For example, relatively larger safety marginals, in terms of speed or position uncertainty, may be required for connection in case multiple operations are to be performed simultaneously or in sequence, such as opening a door and then connecting the connecting means. Additionally, information regarding the current weather, such as waves, wind, ocean currents, snow, ice or icing may be fed to the control means, and then be used to temporarily increase the required safety margins in order to allow a connection to be established at risky weather conditions.

Furthermore, it is preferred that the device 100 comprises a database comprising data regarding various types of movable objects 102 to be handled, and that the sensor means 130 comprises an identification means, which in turn is arranged to automatically identify movable objects 102 of the types for which identifying information is present in the database and that are approaching the object 101. Examples include the optical reading of a number plate on a vehicle, an identified QR code on a ferry or a public transport vehicle, or non-optical remote reading of identifying information such as IMO number, via AIS, RFID or other suitable technique, as described above. The sensor means 130 is in this case arranged to determine the general position of such type-identified objects 102 after the said type identification has been performed. Then, the sensor means 130 is arranged to, by means of said data from the database, determine the position of the connecting means 154 relative to the general position of the object 102. This way, several predetermined types of objects 102 can be accepted by the device 100, something that for example may be useful for different types of boats and ships in locks and quays; for the charging of various types of electrically powered on-road vehicles; and for managing multiple types of connections on the same or different objects 102.

Advantageously, the database can also comprise specific data on the vessel to be connected, such as safety prescriptions and -zones, filling/emptying capabilities, and so on, applying to the ship in question, and that affect how, if, when and in what order different connections are to be established by the device 100.

In a further preferred embodiment, as illustrated in FIG. 3a, the device 300 further comprises a data communication link 380 between the objects 301, 302, as well as an identification means comprised in the sensor means 130, which is arranged to automatically identify and determine the position of movable objects 102 of the type covered by the database and that are approaching the object 101, which means is similar to the above-described identification means. In this example, however, the sensor means 130 is arranged to receive data regarding the position of the connecting means 354, and preferably also information regarding the type of connecting means 354, via the data communication link 380. Then, the sensor means is arranged to first detect the general position of the object 102, as described above, and then the position of the connecting means 354 relative to the general position of the object 302, based on the data received via the data communication link 380, from the object 302 to the object 301. Alternatively, this data is received from a central server.

Figure 7:
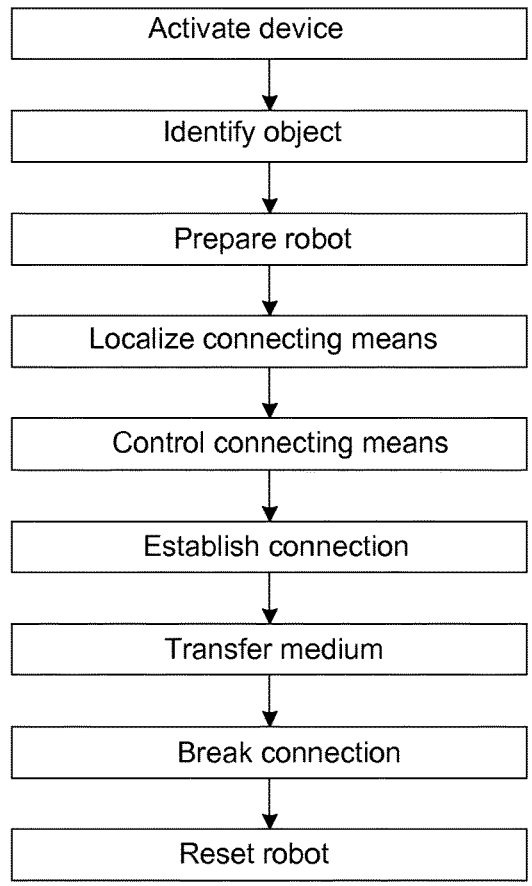
FIG. 7 is a flow diagram illustrating a method according to the invention.

FIG. 7 illustrates a method according to the invention for providing a temporary connection between two objects that are movable relative to each other, such as those described above. The method uses a system 100 of the type described above. Both objects comprise a respective connecting means, and the temporary connection is established in and by the respective connectors of the objects being brought together and connected to each other. As described above, a control means continuously controls the movements of a mobile robot, such that a first of the connecting means thereby is displaced relative to the corresponding object, and a sensor means continuously detects a relative position between said object or said connecting means and the other connecting means, while the objects move relative to each other.

In a first step, the device is activated, which means that the sensor device is set into a position in which an approaching object is to be identified. The activation may for example be initiated by the existence of the approaching object as identified by radar technology; by visual identification; via radio link, such as via AIS (Automatic Identification System); through so-called Long Range RFID, laser or ultrasound; by the crew of the approaching object via a communication link; at a specified time; or otherwise.

In a second step, the approaching object is identified, which may comprise identification of the type, number and relative position of the connecting means; possibly required activating means; and requested services for which connections are to be established.

In a third step, the robot is prepared. This may comprise type selection of one or more connecting means; one or more cabling- and/or hose systems for connection; one or more activating means to be used; and planning of and possibly also performing coarse adjustment of the position of the robot.

In a fourth step, the connecting means of the approaching object is or are identified, using local sensing such as through visual identification. This location then progresses continuously at least until the connection is established, and the sensed position is used in the subsequent control.

In a fifth step, the control means thereafter continuously controls the position of the connecting means of the robot, while the objects are moving relative to each other, so that it is displaced relative to the object on which the robot is installed and up to the connecting means of the approaching object.

In a sixth step, the temporary connection is established by the connecting means being connected to each other.

In a seventh step, which preferably begins substantially immediately after the sixth step, and preferably before the objects have reached the above described parked position, a medium, such as fresh water, electricity or the like, is transferred between the objects. It is preferred that the sensor means visually checks for malfunction during the transfer, such as for leaks, and stops the transfer in case such malfunctions are detected. It is preferable that the transfer is always terminated before the connection is broken. When electricity is transmitted, the transmission can be terminated at a late stage, such as maximally 0.1 seconds, preferably maximally 0.01 seconds, before the disengagement begins. When liquids, powdery substances or gases are transferred, there is a pressure in the hoses and inertia in the transferred medium, and in the device itself (such as in pumps), so that the transfer needs to be stopped at least 1 second, more preferably at least about 5 seconds, but preferably not more than 10 seconds, before the connection is broken.

In an eighth step, once the transfer is complete, the connection is broken. It is preferable that the object on which the robot is installed determines when the transfer is to be completed, for security reasons.

In a ninth step, the robot is then reset for a subsequent connection to another or again the same object.

It will be appreciated that all that has been described above regarding a device according to the invention is also applicable to a method according to the invention, and vice versa.

Figure 8:
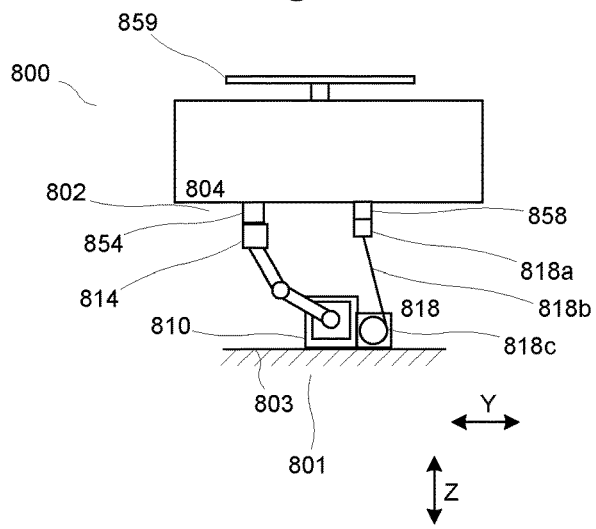
FIG. 8 illustrates a sixth embodiment of a device according to the invention, from the side.

FIG. 8 illustrates a preferred system 800 for use when achieving a connection between an object 801 permanently installed on the ground 803, comprising a robot 810, and one object 802 installed on a flying vessel 804. The robot 810 includes a connecting means 814, and the object 802 comprises a corresponding connecting means 854, which operate in a manner that corresponds to the one described above for other embodiments.

According to this embodiment, the flying vessel 804, which is preferably unmanned, further preferably comprises a lifting means 859, such as a rotor, for exerting a lifting force on the vessel 804, which thus can hover over the ground 803 and the object 801. Furthermore, the connection is a connection for loading or unloading of matter, such as liquid, powder or granular material, to or from the vessel 804. In such loading or unloading, the weight of the vessel 804 is affected, why its control device (not shown) for height control must compensate for such a change if the vessel 804 is to maintain its hovering position while the connection is maintained. This in turn means that the control device must be relatively advanced in order to avoid the fluctuations that otherwise easily occur at such weight changes.

According to this embodiment, in the object 801 there is comprised a counter force device 818, connected to and controlled by the control means of the object 801. A connecting means 818a of the counter force device 818 is arranged to be connected to a corresponding connecting means 858 of the vessel 804. The connecting means 858 may take the form of a loop or a hook, and the connecting means 818a can be connected by means of the robot 810 in a manner similar to the connection of the means 814. A wire 818b extends between the means 818a and a tensioning device 818c, which is arranged to keep the line taut 818b at a certain tension.

According to a preferred embodiment, first the means 814 is connected, then the means 818a is connected, although it is possible to proceed in the opposite order. When the means 818a is connected to the means 858, so that the tensioning device 818c, which is firmly anchored to the ground 803, maintains a tension between the vessel 804 and the ground 803, the lifting means 859 can lift the vessel 804 against an anvil in the form of said tensioning force.

For loading and/or unloading of material, the object 801 is then arranged to, through control of the tensioning device 818c by the control means of the object 801, to compensate via weight changes of the vessel 804 imparted via the loading/unloading, with the corresponding changes in the said tensioning force, so that the force that the lifting means 859 must impart to the vessel 804 in order to maintain a specific hovering height of the vessel 804 is maintained substantially constant, even when the weight of the vessel 804 changes due to said loading/unloading. In a preferred embodiment, the control means of the object 801 detects a weight added to or removed from the vessel 804. In another preferred embodiment, the counter force device 818 comprises a tensioning force sensor, arranged to sense said tension force in the wire 818b, which force sensor is connected to and arranged to feed back to the tensioning device 818c, which in turn is arranged to hold the sensed tensioning force constant along the line 818b.

This entails that the control function of the vessel 804 can be made much simpler without the risk of said undesirable fluctuations to occur, which is particularly preferred for unmanned vehicles such as electrically powered drones.

It is preferred that the counter force device 818 for reasons of security comprises a torque lock, so that its engagement with the vessel 804 is broken if the tensioning force along the line 818b exceeds a predetermined limit value. The torque lock is preferably arranged in the connecting means 818a, so that the engagement with the connecting means 858 releases at such high tensioning forces. It is noted that such counter force device 818 does not cause the object 801 to be primarily intended for mooring of the vessel 804, but it is primarily intended to load/unload said matter while the vessel 804 is provided a resistance against which it can lift.

Above, a number of embodiments have been described. However, it is apparent to the person skilled in the art that many modifications may be made to these embodiments without departing from the basic idea of the invention.

Thus, the principles described in relation to certain embodiments can be applied in the context of many other embodiments, for instance that the communication-based identification according to FIG. 3a can be used in combination with a charging station for electric vehicles as shown in FIGS. 5a-5c; or that the various options for maintaining a connection described in connection to FIGS. 4a-4e can be freely combined with various embodiments disclosed herein, as applicable. In general, where applicable, all the embodiments described herein can be freely combined.

The hoist device 215e may also be used to adjust the height of the robot 210 in relation not only to water surface but also to the various heights of boats or ships which are to be connected.

Moreover, the robots described herein may also, apart from several individualized connecting means 114, 114', have several different activating means 617 which are individually adapted for activating different types of connecting means 654, the types of which are automatically detected by use of the above-described sensor means. Such activating means 617 may also comprise multiple cooperating gripping means, etc., in order to perform parallel or sequential activation measures, depending on the type of the connecting means.

The communication link 380 may also be used for carrying out the ordering of the various services for the automatic delivery by the object 301, as the replenishment of fresh water or the provision of shore power, as the craft 302 wishes, before the approach of the object in question. This is useful for example in ports and sea-locks.

In addition to vessels floating on water and rolling on the ground, the principles of the invention can also be applied to objects that travel below water, such as underwater vessels, and in space, such as space shuttles and satellites.

Thus, the invention is not limited to the embodiments described herein, but can be varied across the scope of the enclosed claims.

The invention claimed is:

1. A method for providing a temporary connection between first and second objects that are movable in relation to each other, wherein the first of said objects comprises a first connecting means and the second of said objects comprises a second connecting means, said temporary connection is established by the first and second connecting means being brought together and connected to each other, the method comprising:
   measuring, with a sensor means, a relative position between the first object or the first connecting means and the second connecting means while the first and second objects move relative to each other; and
   while said first and second objects move relative to each other, controlling, with the control means and based upon a signal from the sensor means, motions of a moveable first robot to:
      displace the first connecting means relative to the first object and up to the second connecting means, and
      connect the first connecting means to the second connecting means so that said temporary connection is established;
   wherein relative movement of the first and second objects including the first and second objects being brought together from a first separated position to a parked position, in the first separated position, the first and second objects are located at a distance from each other that is too great to establish the connection, and in the parked position, the first and second objects are located so close to each other that the first robot can reach to achieve said connection and in which respective equilibrium positions or centers of motion about which the first and second objects move are immobile in relation to each other, and
   wherein the control means controls the first robot so that the connection is established while the objects are being brought together from the first separated position towards the parked position and before the objects have time to reach the parked position.

2. The method of claim 1, wherein both the first and second objects move relative to each other across at least two dimensions of motion, and the control means controls the first robot in at least two dimensions of motion.

3. The method of claim 1, wherein one of the first or second objects is fixedly arranged while the other of the first or second object is movable relative to the fixedly arranged object.

4. The method of claim 2, wherein one of the first or second objects is fixedly installed at a quay and the other of the objects is fixedly installed on a boat or a ship floating on a water surface by the quay, and the connection is a connection for delivering electrical power, fresh- or sewage water, and/or foodstuffs between the first and second objects.

5. The method of claim 4, wherein the fixedly installed object at the quay is fixedly installed by a boat- or ship sea-lock in which the water surface is movable in a height direction, the fixedly installed object at the quay comprises a height adjustment means on which the first robot is mounted, and the control means controls a height position of the first robot by controlling the height adjustment means to correspond to a current water surface level.

6. The method of claim 3, wherein one of the first or second objects is installed on a vessel which is movable on a support, and the other one of the first or second objects is a permanently installed station for, using said connection, deliver electrical power, fresh- or sewage water and/or supplies between the first and second objects, or to collect and remove exhaust fumes from an exhaust system of the vessel.

7. The method of claim 1, wherein both the first and second objects are movably arranged relative to a fixed coordinate system as well as to each other.

8. The method of claim 1, wherein the control means controls the first robot so that the connection is broken while the first and second objects move from the parked position to a second, separated, position, in which the first and second objects again are arranged at a distance from each other, and after the first and second objects have left the parked position.

9. The method of claim 1, wherein both of the first and second objects are movable relative to each other even after the connection has been established, and the control means actively and continuously controls the first robot so that a part of the first robot which is arranged to maneuver or maintain the first connecting means is immobile relative to the second connecting means.

10. The method of claim 9, wherein the control means actively and continuously controls the first robot so that the first connecting means is immobile relative to the second connecting means.

11. The method of claim 1, wherein the first robot is caused to, after the connection has been established, release itself from the first connecting means so that the first connecting means thereafter is freely movable within at least a limited surface or volume relative to the first robot.

12. The method of claim 11, wherein at least one additional movable robot cooperates with the first robot, so that one of the robots maintains the connection and to thereafter release itself from the first connecting means, while the other of the robots breaks the connection.

13. The method of claim 1, wherein a second movable robot displaces the second connecting means relative to the second object, and a second sensor means measures a relative position between the second object or the second connecting means and the first connecting means while the first and second objects move relative to each other, as a second control means controls the movements of the second robot and the displacement of the second connecting means relative to the first connecting means.

14. The method of claim 1, wherein the first robot is permanently mounted on a coarse adjustment device by means of which the first connecting means is displaceable along at least one direction relative to the first object, and the control means controls the position of the coarse adjustment means relative to the second object, and the control means also controls the movements of the first robot in order to fine-tune the position of the first connecting means relative to the second connecting means.

15. The method of claim 1, wherein the first robot comprises an activating means configured to activate the second connecting means, and the method further comprising activating the second connecting means by controlling the activating means with the control means prior to establishing the connection.

16. The method of claim 1, wherein the connection is established only in case an amplitude and/or frequency of the relative movements of the first and second objects relative to each other during a certain time period fall within an acceptable respective interval, and the control means, before this condition is met, actively and continuously controls the first robot so that the first connecting means is immobile relative to the second connecting means.

17. The method of claim 1, wherein the first object is permanently mounted on the ground, the second object is mounted on a flying vessel, and a counter force device is fastened to the vessel and applies a tension force between the vessel and the ground, counteracting a lifting force of the vessel while the connection is maintained.

* * * * *